April 14, 1931.                J. P. BUNCE                1,801,034
                         TRAY AND LIKE CONVEYER
                   Filed Nov. 1, 1928        4 Sheets-Sheet 1

April 14, 1931. J. P. BUNCE 1,801,034
TRAY AND LIKE CONVEYER
Filed Nov. 1, 1928 4 Sheets-Sheet 2

April 14, 1931.  J. P. BUNCE  1,801,034
TRAY AND LIKE CONVEYER
Filed Nov. 1, 1928  4 Sheets-Sheet 3

April 14, 1931.  J. P. BUNCE  1,801,034

TRAY AND LIKE CONVEYER

Filed Nov. 1, 1928  4 Sheets-Sheet 4

Patented Apr. 14, 1931

1,801,034

UNITED STATES PATENT OFFICE

JOHN PERCIVAL BUNCE, DECEASED, LATE OF WILLESDEN, LONDON, ENGLAND, BY GWENDOLINE DENNING BUNCE, ADMINISTRATRIX, OF GREENFORD, ENGLAND, ASSIGNOR TO BAKER PERKINS COMPANY INC., OF SAGINAW, MICHIGAN

TRAY AND LIKE CONVEYER

Application filed November 1, 1928, Serial No. 316,568, and in Great Britain November 3, 1927.

This invention relates to conveyers such as endless or chain conveyers of the kind adapted to carry a series of trays or platforms on which loose goods or goods liable to become loose are transported, the invention being particularly applicable in connection with tray-conveyers carrying moulded fondants or other sweetmeats, or chocolate which has been deposited in the trays in a plastic state and subsequently cooled into slabs intended eventually to be delivered from the trays at an appropriate time or place.

For delivery purposes it is necessary or convenient to cause the trays to be inverted but it will be appreciated mere inversion would produce haphazard discharge of the contents and that reliable delivery at an appointed place without shock is to be desired whether the contents be in unit form, as in the case of slabs of chocolate or the like, or whether it comprises more than one constituent, for example starch and fondants or the like.

An object of the present invention is to provide means adapted to invert the trays and to prevent the displacement or falling of the goods from trays or the like while they are being inverted or until the desired time for their delivery arrives, and a further object of the invention is to provide improved means adapted to facilitate appropriate discharge of the goods from the trays, and where necessary separate the constituents of the contents thereof, so that such are deposited from the inverted trays at the desired time or place or in a suitable order or sequence which both facilitates collection and at the same time ensures the absence of damage to or spoliation of finish of the goods.

According to the invention at a turning point in the conveyer which inverts or aids in the inversion of the trays, a lid or covering means is provided and adapted temporarily to come in succession into contact or association with the goods or face of the trays on the inward or outward side of the inversion path, or as the trays arrive at the turning point.

The invention further consists in causing the conveyer to make a lap or turn which inverts the trays and subsequently to follow a path wherein the inverted trays are subjected to a contents-ejecting action such as that of shaking or rapping, to cause them to deposit their contents upon an auxiliary travelling conveyer adapted to facilitate collection, separation or the like.

The auxiliary conveyer or band may be of impervious material or it may be of a mesh or net structure whereby it is adapted to serve additionally as a separating or sieving means for separating or dividing the constituents of the tray contents one from another, as for example the separation of fondants or the like from the moulding starch.

The means for preventing falling or displacement of the goods before the proper time may comprise a polygonal roller or rotary device the facets of which (or certain of them) are more or less coextensive with the trays and adapted successively to register therewith. The roller may be lapped by or associated with a covering band or endless auxiliary conveyer belt adapted to conform to the character of the shape of the roller as it passes into association therewith, and this conveyer or belt may conveniently be extended and utilized as the delivery conveyer referred to above.

The arrangement according to the invention may be such that the facets of the roller engage with the faces of the trays or with the backs thereof. In the latter case the auxiliary conveyer or band is arranged so as to act as a covering for the tray faces.

According to a further feature of the invention the polygonal roller may be hollow and have its facets constituted of openwork or sieve-like form, internally arranged conveyer or discharge means being adapted to deliver the separated material in an axial direction.

In the accompanying drawings:—

In carrying the invention into effect according to one convenient mode as applied to a chain tray-conveyer, the tray-conveyer B is caused to pass over a polygonal roller C the disposition of the roller and the arrangement of the conveyer being such that the trays 1 register with the facets 2 of the roller and as they pass around its axis are inverted. The roller as indicated above is provided with a series of faces or facets each of which is adapted in turn to register with a tray surface area so that as the trays proceed around the roller they are successively covered by the facets of the roller somewhat like the application of a temporary lid. The number of the faces upon the polygonal roller will depend upon the size of the trays and their relative disposition. The facets of the polygonal roller may adjoin one another or where the trays are spaced apart, may be separated from one another by subsidiary facets or curved surfaces which are adapted to accommodate or correspond with the spacing interval between the trays. Similarly, where the trays are close together and if it is desired that the tray covering faces of the roller should enter into the trays, the roller may be provided between its main faces with formations which will accommodate and mesh with the transverse edges of the trays.

Figure 6:
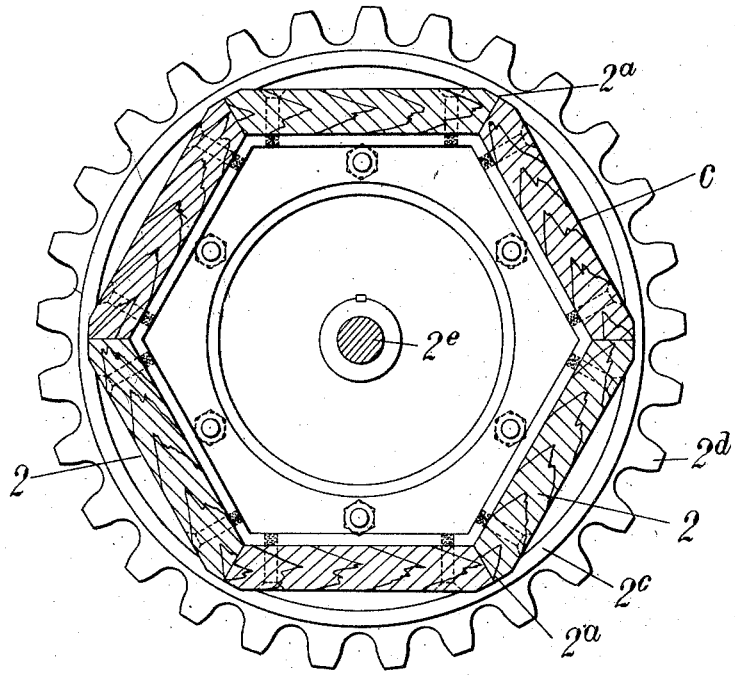
Figures 6 and 7 are respectively a cross section and longitudinal section of a polygonal roller according to the invention.
Figure 7:
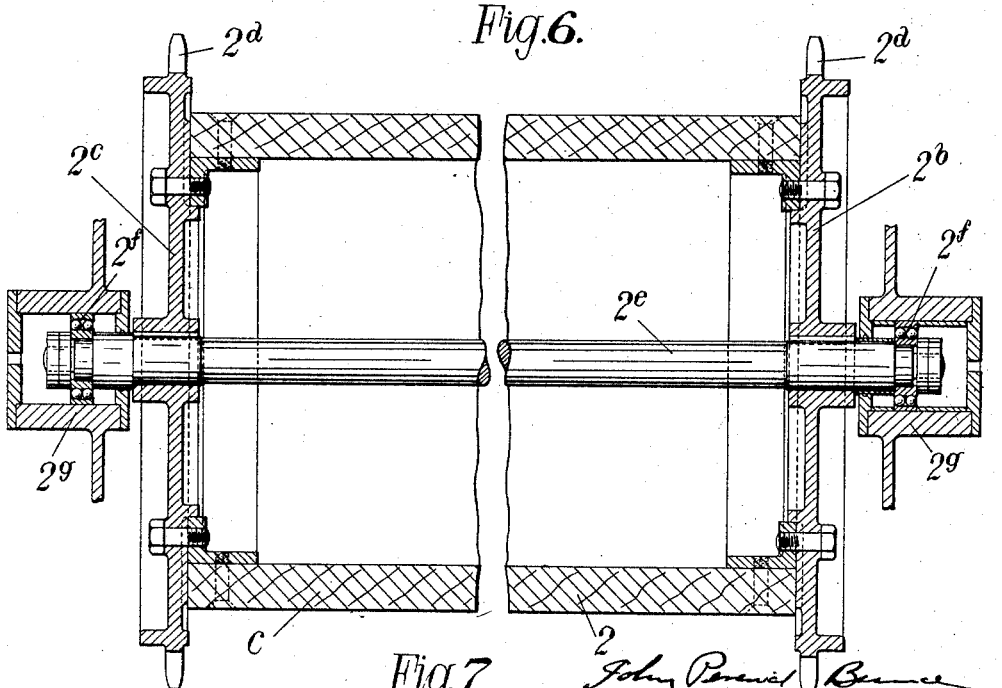

According to one suitable arrangement (Figures 6 and 7) a polygonal roller C is provided with six main facets 2 between each pair of which a subsidiary facet or narrow flat or curved edge $2^a$ is provided. The facets are mounted between two end discs or heads $2^b$ and $2^c$ formed in one with or rigidly secured to chain wheels, elements or teeth $2^d$ of which are adapted to mesh with the chain of the tray conveyer B. The roller is carried by a shaft $2^e$ keyed or otherwise secured to the discs $2^b$ and $2^c$ and mounted in suitable bearings $2^f$ carried by baskets $2^g$. The extent of the main surfaces 2 corresponds with the longitudinal extent of the trays while the width of the roller corresponds with the width of the trays. The flats or subsidiary facets are adapted to register with the intervals between trays.

This hexagonal roller is covered by (and adapted to drive or be driven by) an auxiliary conveyer band D the upper lap of which is arranged to extend from the upper side of the roller C away to a convenient delivery point. The tray-conveyer after it leaves the hexagonal roller C may follow a horizontal or any other desired path. Assuming that it follows a horizontal path 4 the upper lap of the auxiliary or delivery conveyer D may travel through a suitable distance parallel with the tray-conveyer so that the inverted trays 1 can transfer their contents to the conveyer D or it may be preferred that the delivery conveyer as it leaves the hexagonal roller, diverges gradually from the path of the tray-conveyer as seen at 5. In either case the contents will be discharged from the trays and deposited on the conveyer and will not sustain shock or damage.

For the purpose of ensuring the delivery of the contents from the inverted trays their conveyer may pass, immediately after leaving the roller C, through a zone in which the conveyer is shaken or the backs of the trays are rapped or otherwise agitated by known means so that the contents are delivered or become detached from the trays and are deposited upon the auxiliary conveyer D.

Figure 4:
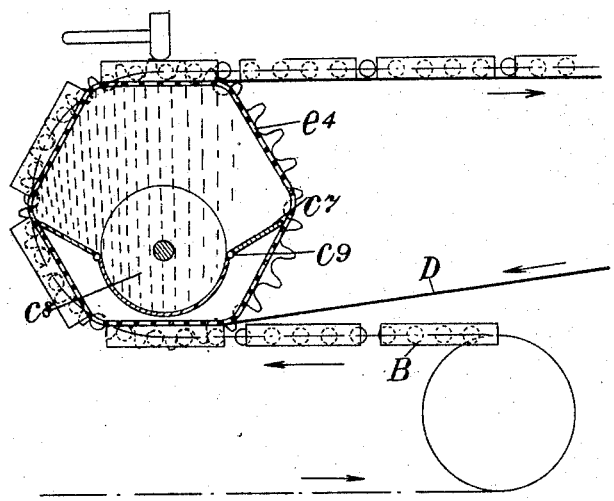
Figures 4 and 5 are, respectively, a cross section and longitudinal section of a polygonal roller according to the invention illustrating a modification in which the polygonal roller operates with a sieving action.
Figure 5:
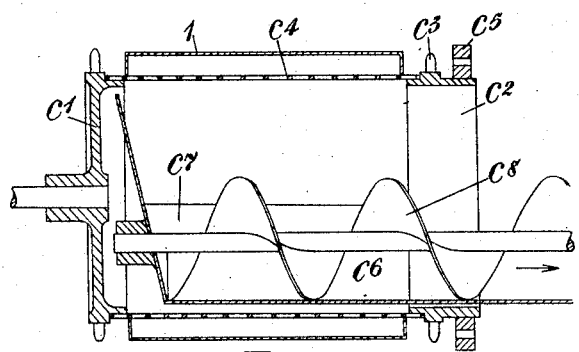

In carrying the invention into effect according to another mode, the polygonal roller C itself may be adapted to act as a sieving or separating means (see Figure 4). The roller may comprise a framework on which a sieving screen is stretched so that the facets of the roller act as sieves or the whole of the periphery thereof performs this function. According to an alternative construction, the roller may have end discs or heads $C^1$, $C^2$ formed in one with or rigidly secured to chain wheels, elements or teeth $C^3$ with which the chain of the tray-conveyer B is adapted to mesh. Between these heads on annular flanges formed thereon a perforated plate element (or elements) $C^4$ is (or are) mounted so that the whole of the surface may act as a sieving means. This surface $C^4$ may be lapped by a wire mesh band D of an appropriate gauge. The head $C^1$ may be supported on a suitable trunnion mounting while the other $C^2$ which is annular may be mounted in an appropriate race support indicated at $C^5$. Within the roller and passing through the open end of the head $C^2$ a fixed chute or trough $C^6$ having deflecting plates $C^7$ is mounted. Within the trough a helical or worm conveyer $C^8$ is mounted and the starch or other powdered matter falling through the screen $C^4$ is delivered axially of the roller to the appropriate point of collection.

In some cases in order to collect in the trough all the material passing through the screen $C^4$ the side deflecting plates $C^7$ may be pivotally mounted, as at $C^9$, upon the trough $C^6$ and the free extremities of the plates $C^7$ may be adapted to ride on the internal surface of the screen plate $C^4$ for which purpose the internal corners of the roller may be suitably curved enabling the plates C⁶ to accommodate themselves to the varying diameter of the screen C⁴.

Figure 1:
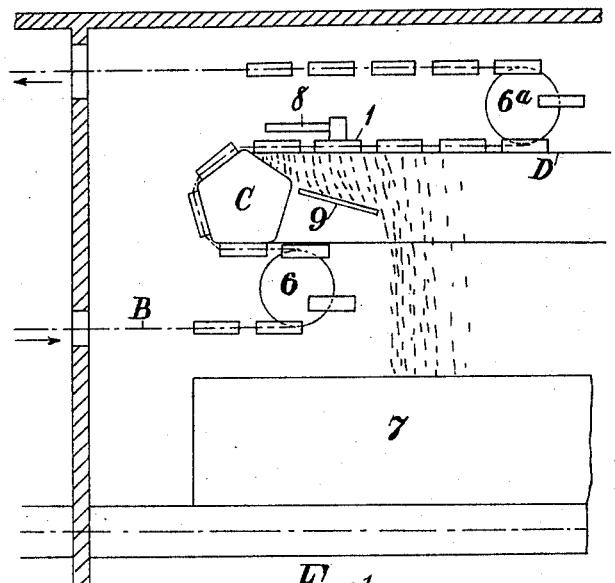
Figure 1 is a diagrammatic sectional side elevation illustrating the employment of an auxiliary conveyer for separating or sieving purposes.

According to a modification (see Figure 1) the tray-conveyer B is adapted to pass around a roller guiding means 6 so that the trays are maintained level and come into contact with the lower lap of an auxiliary conveyer D from whence they come under the charge of the polygonal roller C. In this case the device is adapted to procure the separation of the contents of the trays, for example moulding starch and fondants, and to deliver the latter more or less free from starch. The auxiliary conveyer D is in the form of a metal net or mesh band so that as the trays 1 move onto the band D in the inverted position after leaving the polygonal roller C, the starch constituent of the trays passes through the conveyer band D in a shower which may be collected by any suitable means, such as for example a box or chute 7.

In order to protect the trays and the guiding device 6 from the falling starch a baffle or board 9 may be positioned so that the shower of starch in this locality may be deflected.

If desired, the trays may be subjected to a tapping or rapping appliance 8 as they pass along in contact with the band D.

Another guiding device may be positioned as at 6ª to lift the trays from the band D or the arrangement may be such as to move them on a path divergent from the conveyer D.

From the guiding device 6ª the tray-conveyer passes on a return lap for re-charging or any other purpose.

Figure 2:
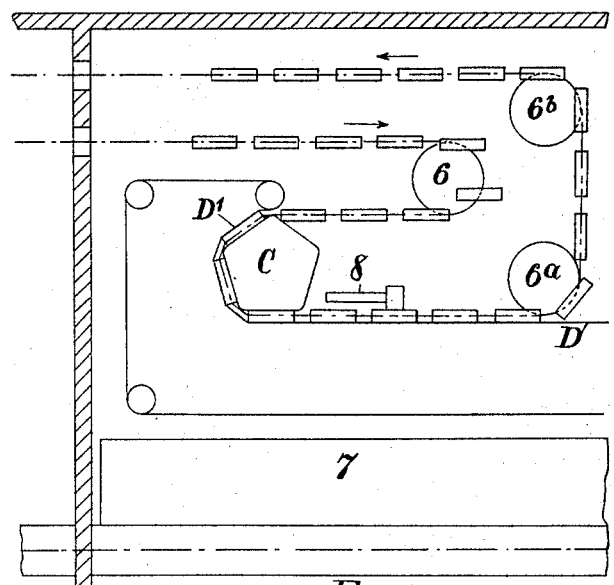
Figures 2 and 3 are diagrammatic elevations illustrating a modification of the invention in which a polygonal roller engages the backs of the trays and an auxiliary conveyer or band is employed to cover the face of the trays while they are passing round the roller during their turning movement.

According to another modification (see Figure 2) the faces of the trays instead of being engaged by the facets of the polygonal roller C are turned away therefrom so that the backs of the trays engage and rest upon the facets. The trays may be passed in a downward direction over guiding means 6 to the polygonal roller C where an auxiliary or delivery conveyer D (which may be also adapted to act as a sieve) is mounted so that it laps the trays, as at D', as they pass around the roller C so that the faces of the trays are temporarily covered by this portion of the auxiliary conveyer and the contents of the trays kept in place. In this case as in the preceding one the trays may be subjected to a rapping device 8 for discharging the contents of the trays, and guiding means 6ª and 6ᵇ may be provided for moving the trays away from the conveyer band D and guiding the tray-conveyer on its return path. Where the tray-conveyer D is adapted to act as a sieve a collecting chute or box 7 may be employed.

Figure 3:
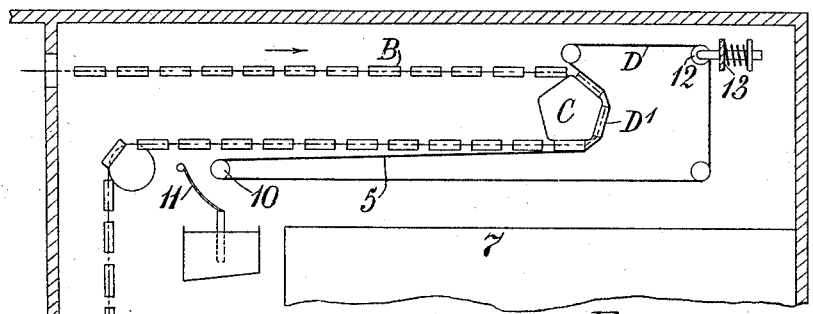

Figure 3 illustrates a further modification of the form of the invention described above in which the tray-conveyer B passes directly under the control of the polygonal roller C without previously being subjected to guiding devices, such as 6, referred to previously. The auxiliary conveyer D is arranged to lap the trays while on the roller C as at D' and is given a divergent path 5 so that the trays separate therefrom while discharging their contents gradually or without shock. The conveyer D may be adapted to act as a sieve in which case the powdered contents of the trays and starch or other matter may be collected in the box or chute 7. The solid constituents of the trays, such as fondants and the like, may be discharged from the end of the conveyer D, as at 10, onto a chute or collecting means 11. The empty trays after leaving the conveyer D may be guided or led in a suitable path to a re-charging station or for any appropriate treatment.

The conveyer D in each of the cases described above may be provided with means for keeping the laps taut or appropriately tensioned. For example, the conveyer may pass over a roller such as 12 supported in resiliently mounted bearing or bracket elements 13 (Figure 3).

The polygonal roller may be driven by any suitable means and may serve as a drive for the auxiliary or delivery conveyer. Alternatively, the polygonal roller may be driven by the engagement or meshing action therewith of the trays of the tray-conveyer or by aid of chain wheel elements from the chain of the tray-conveyer. Where the polygonal roller C is not driven by the tray-conveyer, the drive is adjusted so that the rate of revolution of the roller is arranged to synchronize with the tray-conveyer whereby the facets or tray-engaging surfaces on the roller register in succession with the trays.

What is claimed is:—

1. A method of delivering the contents from the trays of a tray-conveyer, consisting in causing the trays to travel in a path that causes their inversion, coincidently closing the trays by covering them with a flexible screening band during and after their inversion, for depositing their contents on the band, and delivering said contents from the trays by directing the band divergently from the path of travel of the conveyer.

2. In combination, a tray conveyer, a polygonal roller having facets with which trays on said conveyer register in succession, and an auxiliary conveyer consisting of a flexible screening band constrained to pass around the roller with the trays, said band disposed relatively to the facets and trays in a manner to constitute a temporary supporting surface for the contents of the trays during such passage, said trays and band arranged to proceed along diverging paths after leaving the roller, for the purposes set forth.

3. In combination, a tray conveyer, a polygonal roller having facets with which trays on said conveyer register in succession, and an auxiliary conveyer consisting of a flexible band actuated to travel around the roller with the trays, said band disposed relatively to the facets and trays in a manner to constitute a temporary supporting surface for the contents of the trays and also constituting a sieve for the separation of said contents, the paths of travel of said trays and band diverging after leaving the roller.

4. A polygonal roller with flat facets, a traveling material conveyer carrying open trays arranged to register in order the successively presented facets of said roller and to remain in contact therewith during rotation of said roller sufficient to effect inversion of the trays, a traveling sieve band overlying the trays and constituting a temporary closure therefor during their engagement with said facets, the paths of travel of said band and trays diverging after leaving the roller, for the purposes set forth.

5. In combination, a tray-conveyer, a polygonal roller carrying said conveyer and arranged to cause the inversion of the trays, screening facets on the roller adapted to successively come into register with the open faces of successive trays, said facets temporarily constituting lids for maintaining the contents of the trays in position while passing around the roller, a screening flexible band passing around the roller between the facets thereof and the trays, material-collecting means below the facets and material-discharging means axially disposed within said roller, for the purposes set forth.

6. A tray conveyer having a polygonal roller with the facets of which the trays are adapted successively to engage, in combination with a perforate conveyer band operatively arranged to travel with and to temporarily close the trays while they are engaged with said facets, for the purposes set forth.

In testimony whereof I have signed my name to this specification.

GWENDOLINE DENNING BUNCE,
*Administratrix of the Estate of John Percival Bunce, Deceased.*